United States Patent
Lutz et al.

(10) Patent No.: US 12,352,348 B2
(45) Date of Patent: Jul. 8, 2025

(54) PLANETARY-GEAR MECHANISM WITH A DRIVING SHAFT AND A FIRST SUN GEAR

(71) Applicant: SEW-EURODRIVE GMBH & CO. KG, Bruchsal (DE)

(72) Inventors: Markus Lutz, Oberhausen-Rheinhausen (DE); Martin Löffel, Pfinztal (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 27 days.

(21) Appl. No.: 18/692,888

(22) PCT Filed: Sep. 6, 2022

(86) PCT No.: PCT/EP2022/074707
§ 371 (c)(1),
(2) Date: Mar. 18, 2024

(87) PCT Pub. No.: WO2023/041371
PCT Pub. Date: Mar. 23, 2023

(65) Prior Publication Data
US 2024/0392870 A1    Nov. 28, 2024

(30) Foreign Application Priority Data
Sep. 16, 2021 (DE) .......... 102021004680.3

(51) Int. Cl.
*F16H 57/00* (2012.01)
*F16D 1/06* (2006.01)
*F16H 1/46* (2006.01)

(52) U.S. Cl.
CPC .......... *F16H 57/0025* (2013.01); *F16D 1/06* (2013.01); *F16H 57/0006* (2013.01); *F16H 1/46* (2013.01)

(58) Field of Classification Search
CPC .... F16H 57/0025; F16H 57/0006; F16H 1/46; F16D 1/06
See application file for complete search history.

(56) References Cited

U.S. PATENT DOCUMENTS 4,106,366 A    8/1978    Altenbokum
5,370,014 A *  12/1994   Pigozzi ............... F16H 57/021
                                                74/606 R
(Continued)

FOREIGN PATENT DOCUMENTS

CN    200968385 Y    10/2007
DE    2558093 A1     6/1977
(Continued)

OTHER PUBLICATIONS

International Report on Patentability issued in corresponding International Application No. PCT/EP2022/074707, dated Mar. 5, 2024, pp. 1-9, English Translation.
(Continued)

*Primary Examiner* — Farhana Pervin
(74) *Attorney, Agent, or Firm* — Carter, DeLuca & Farrell LLP

(57) ABSTRACT

A planetary-gear mechanism includes a driving shaft and a first sun gear. The first sun gear is connected to the driving shaft for cojoint rotation. The driving shaft has a bore, e.g., an axial bore. The first sun gear has a stub portion, and a screw is screwed into a threaded bore in the stub portion. The screw head presses onto a plate part, which presses onto the stub portion via a spring device or via a spring device and at least one spacer, and the plate part bears against the driving shaft.

24 Claims, 2 Drawing Sheets

(56) References Cited

U.S. PATENT DOCUMENTS

| | | | |
|---|---|---|---|
| 11,359,700 B2 | 6/2022 | De Morais | |
| 2020/0200252 A1* | 6/2020 | Jeon | F16H 57/0025 |
| 2022/0196119 A1* | 6/2022 | Yao | F16H 57/021 |
| 2023/0193944 A1* | 6/2023 | Salvucci | B25B 13/50 |
| | | | 411/337 |

FOREIGN PATENT DOCUMENTS

| | | |
|---|---|---|
| DE | 3516604 A1 | 11/1986 |
| DE | 3521020 A1 | 12/1986 |
| DE | 102019006068 A1 | 3/2020 |
| JP | H0776233 A | 3/1995 |

OTHER PUBLICATIONS

International Search Report issued in corresponding International Application No. PCT/EP2022/074707 dated Nov. 29, 2022, pp. 1-2, English Translation.

\* cited by examiner

PLANETARY-GEAR MECHANISM WITH A DRIVING SHAFT AND A FIRST SUN GEAR

FIELD OF THE INVENTION

The present invention relates to a planetary-gear mechanism with a driving shaft and a first sun gear.

BACKGROUND INFORMATION

In certain conventional systems, a planetary-gear mechanism has a driving shaft and a driven shaft.

A gearbox with at least a first and a second planetary gear stage is described in German Patent Document No. 10 2019 006 068.

A planetary carrier for planetary gearing serving as reduction gearing for a mining machine is described in German Patent Document No. 35 21 020.

A wind power plant with transmission is described in Chinese Patent Document No. 200968385.

SUMMARY

Example embodiments of the present invention provide a planetary-gear mechanism having a long service life.

According to example embodiments of the present invention, in a planetary-gear mechanism having a driving shaft and a first sun gear, the first sun gear is connected to the driving shaft for cojoint rotation. The first sun gear has a stub portion, e.g., a shaft stub, and a screw is screwed into a threaded bore in the stub portion. The screw head presses onto a plate part, which presses onto the stub portion via a spring device or via a spring device and at least one spacer. The plate part, e.g., on its side facing away from the spring device, bears against the driving shaft and/or touches the driving shaft at least temporarily.

Thus, a long service life can be achieved. This is because the elastically preloaded plate part not only transmits axial shocks from the driving shaft to the first sun gear in a damped manner, but also prevents edge loading of the meshing teeth, e.g., the meshing teeth of the first sun gear and the first planetary gear. This is because the plate part can also be used to position the first sun gear axially in relation to the driving shaft. Thus, the axial position of the first sun gear in relation to the first planetary gear of the first planetary gear stage can also be determined. The foregoing arrangement also provides for the floating mounting of the first and, where applicable, further sun gears. The driving shaft is aligned coaxially to the driven shaft and also to the sun gear(s). With such a floating mounting, the first or each of the sun gears has a non-vanishing axial play. For example, the play is one millimeter. Since the driving shaft is mounted on at least one fixed bearing and the driven shaft is substantially also mounted on one fixed bearing, the aforementioned axial play remains for the first sun gear or the entire strand of sun gears. Additionally, a deep groove ball bearing is arranged on the end face of the driven shaft and, if applicable, on the other sun gears beyond the first shaft, however, the first sun gear does not have a deep groove ball bearing towards the driving shaft but it has the plate part arranged preloaded via the spring device. If the axial play of the first sun gear or of the strand formed from the sun gears is reduced due to thermal effects or due to shocks, the first sun gear and also its stub area are spaced apart from the driving shaft by the preloaded plate part and the contact of the plate part occurring at the driving shaft. The first sun gear can be displaced towards the driven shaft, e.g., by the first sun gear pressing onto the deep groove ball bearing arranged on the end face of the second sun gear and thus displacing this second sun gear towards the driven shaft, e.g., onto a deep groove ball bearing arranged on the end face of the third sun gear, so that the third sun gear is pushed onto the deep groove ball bearing arranged on the end face of the driven shaft.

In this manner, for example, the first sun gear is positioned axially and, if applicable, the other sun gears as well, so that edge loading can be prevented when meshing with the respective planetary gears. This ensures a long service life.

Alternatively, a vanishing axial play can also be provided so that the plate part at least slightly preloads the strand formed from the sun gears, thereby forcing an axial positioning of all sun gears.

According to example embodiments, the driving shaft has a bore, e.g., an axial bore, and the stub portion projects into the bore, e.g., is accommodated in the bore. Thus, a driving shaft can be readily connected to the first sun gear for cojoint rotation.

According to example embodiments, the plate part bears against a step of the bore, which is arranged as a stepped bore. Thus, axial shocks are damped, and axial positioning is secured.

According to example embodiments, the threaded bore is arranged in the center of the stub portion, e.g., cylindrical stub portion, and/or in an axially aligned manner. Thus, ready production is possible.

According to example embodiments, the stub portion has an external toothing which is cut into the bore, e.g., into the wall of the bore, or which meshes with an internal toothing of the driving shaft, which internal toothing is arranged in the bore. Thus, the connection for cojoint rotation also has a coupling function.

According to example embodiments, the plate part is rotationally symmetrical, e.g., in relation to the axis of rotation of the first sun gear. Thus, ready production is possible.

According to example embodiments, the first sun gear has a toothing which meshes with the toothing of a first planetary gear, which toothing meshes with the internal toothing of a first ring gear, which is firmly connected to a housing part of the gear mechanism or is arranged in one piece, e.g., in one part. Thus, the service life of a planetary-gear mechanism can be extended.

According to example embodiments, the first planetary gear is rotatably mounted on a pin of a first planetary carrier, which is rotatably mounted and connected to a second sun gear for cojoint rotation. Thus, inexpensive production is possible.

According to example embodiments, the second sun gear has a stub area which has an external toothing which is cut into a bore of the first planetary carrier or meshes with an internal toothing of the first planetary carrier. A first annular groove and a second annular groove, which is, e.g., axially spaced from the first annular groove, are provided in the stub area of the second sun gear. A first retaining ring is accommodated in the first annular groove, and a second retaining ring is accommodated in the second annular groove, and the external toothing is arranged in the axial direction between the first and second retaining ring, e.g., such that the second sun gear is fixed in the axial direction relative to the first planetary carrier. Thus, ready production is possible.

According to example embodiments, the plate part is pressed by the spring device onto the driving shaft, e.g., onto the step of the bore of the driving shaft, which is arranged as a stepped bore. Thus, the plate part bears in a preloaded manner against the driving shaft, and, thus, the axial position of the first shaft is preloaded. For example, the first sun gear is pressed against the second sun gear, which is secured relative to the first planetary carrier via the retaining rings. In this manner, edge loading can be prevented, and, thus, a long service life can be achieved.

According to example embodiments, the spring device is arranged between the plate part and the first sun gear and/or the stub portion. Thus, the plate part is pressed against the driving shaft by the spring device, and the first sun gear is pressed against the second sun gear, which, however, is axially secured via safety rings on the first planetary gears. The second sun gear can be rotatably mounted relative to the first sun gear via a deep groove ball bearing. For example, the deep groove ball bearing can be arranged axially between the first and second sun gear.

According to example embodiments, in relation to the axis of rotation of the first sun gear, the radial distance area covered by the stub portion and/or by the first sun gear includes the radial distance area covered by the plate part.

According to example embodiments, the plate part, the spring device, and the at least one spacer are accommodated and/or countersunk in a bore in the stub portion. The bore, together with the threaded bore, forms a further stepped bore, e.g., in the stub portion. Thus, an elastic preload can be created between the plate part and the first sun gear.

According to example embodiments, the driving shaft is rotatably mounted via two bearings, which are accommodated in the housing of the planetary-gear mechanism. Thus, ready production is possible. In addition, the first sun gear is rotatably mounted via the driving shaft and via the toothings of the at least three first planetary gears which mesh with the first sun gear, since these are spaced as regularly as possible from one another in the circumferential direction.

Alternatively, only one of the bearings is accommodated in the housing of the planetary-gear mechanism and the other is accommodated in an electric motor, which is connected to the planetary-gear mechanism on the driving side and the rotor shaft of which is connected to the driving shaft for cojoint rotation or, alternatively, is arranged as one piece.

According to example embodiments, the plate part is made of metal. Thus, a long service life can be achieved.

According to example embodiments, the outer diameter, e.g., the largest outer diameter, of the stub portion is smaller than the outer diameter of the toothing of the first sun gear which meshes with the toothing of the planetary gear. Thus, the stub portion contributes only slightly to the moment of inertia of the first sun gear.

Further features and aspects of example embodiments of the present invention are explained in more detail below with reference to the appended schematic Figures.

DETAILED DESCRIPTION

Figure 1:
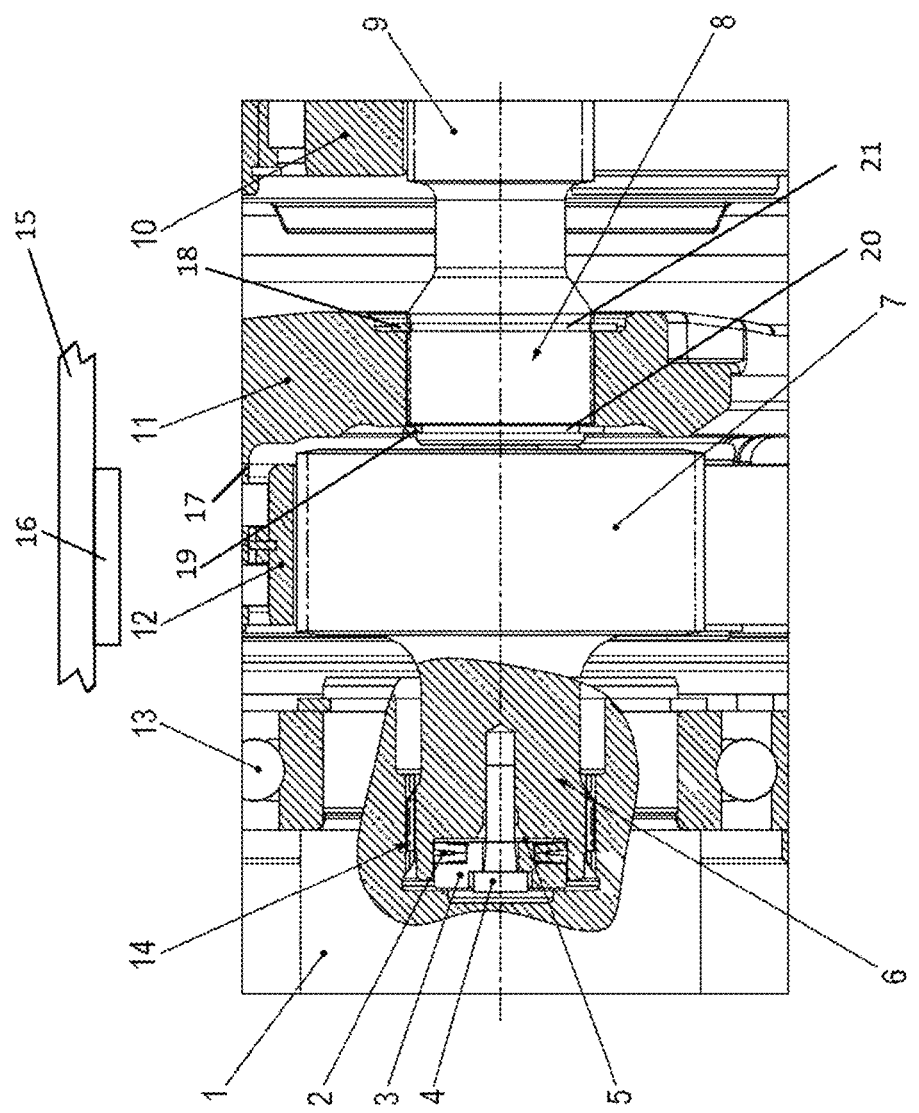
FIG. 1 is a cross-sectional view of a multi-stage planetary-gear mechanism, in which a spacing bracket is screwed into a first sun gear 7.

As illustrated in the Figures, a driving shaft 1 is connected to a first sun gear 7 for cojoint rotation.

For this purpose, for example, the driving shaft 1 has an internal toothing in the bore accommodating the stub portion 6, which internal toothing meshes with an external toothing of the stub portion 6 after insertion of the stub portion 6 of the first sun gear 7 into the bore of the driving shaft 1, e.g., into the internal toothing, e.g., with play in the circumferential direction.

As an alternative, the stub portion 6 of the first sun gear 7 is pressed into the bore of the driving shaft 1. For example, the stub portion 6 of the first sun gear 7 has an external toothing which, when it is pressed in, cuts into the material of the driving shaft 1. This ensures a play-free connection.

In both arrangements mentioned above, the driving shaft 1 is connected to the stub portion 6 for cojoint rotation.

To achieve a spacing in the axial direction, a screw 4 is screwed into a threaded bore in the stub portion 6. The bore axis of the threaded bore is aligned coaxially with the axis of rotation of the stub portion 6 and/or the first sun gear 7.

The screw head of the screw 4 presses a plate part 3 towards the first sun gear 7 onto an interposed spring device 2, which is pressed onto the stub portion 6 via at least one spacer 5, e.g., a shim washer.

For this purpose, the threaded section of the screw 4 is inserted through the plate part 3 and through the spring device 2 and the at least one spacer 5.

The screw head is countersunk in the plate part 3. For this purpose, the plate part 3 has a corresponding, e.g., axially aligned, recess.

The spring device 2 is spaced from the screw 4, e.g., also from the threaded section of the screw 4, via the plate part 3.

The spacers 5 are arranged as perforated washers.

The number of spacers 5 is a natural number, i.e., at least one.

The number of spacers 5 and the screw-in depth of the screw 4 in the threaded bore of the shaft stub 6 of the first sun gear 7 are selected such that the spring device 2 is elastically loaded. The screw head thus presses the plate part 3 towards the first sun gear 7 until the spring device 2, which is in contact with the stub portion 6 via the spacers 5, is elastically loaded by the plate part 3.

Since the plate part 3 projects towards the driving shaft 1, e.g., beyond the screw head, and is or can be in contact with the driving shaft 1, axially directed vibrations that are introduced via the driving shaft 1 are damped towards the stub portion 6. In addition or alternatively, however, vibrations can also be generated and introduced by the planetary gear toothing which meshes with the toothing of the first sun gear and also with the toothing of the ring gear of the first planetary gear stage of the planetary gear.

For example, as a bore, the driving shaft 1 has a stepped bore so that the screw head does not touch any material of the driving shaft 1, e.g., also if the plate part 3 bears against a step of the stepped bore and the spring device 2 is maximally compressed and thus the screw head projects into the deepest part of the stepped bore of the driving shaft 1.

A bearing 13, which rotatably mounts the driving shaft 1, is accommodated in the housing of the planetary-gear mechanism.

The first sun gear 7 has an external toothing which meshes with the toothing of a planetary gear 12, which is rotatably mounted around a pin portion 17 of a planetary carrier 11, into which a stub portion 8 of a second sun gear 9 is inserted and connected for cojoint rotation. The toothing of the first planetary gear 12 also meshes with the internal toothing of a ring gear 16 which is firmly connected to the housing 15.

For example, edge loading of the toothing of the first sun gear 7 is prevented.

The toothing of the second planetary gear 10 is in mesh with the toothing of the second sun gear 9, wherein the stub portion 8 of the second sun gear is positioned axially to the planetary carrier 11 by means of retaining rings 18, 20 accommodated in grooves 19, 21 the stub portion 8.

The toothing of the second planetary gear 10 also meshes with the internal toothing of a second ring gear, which is firmly connected to the housing.

The axial length of the toothing of the first sun gear 7 is greater than the axial length of the toothing of the first planetary gear 12. The first sun gear 7 is thus arranged in a floating manner in an axial direction.

The one of the two bearings of the driving shaft 1 which is closer to the first sun gear 7 is arranged as a fixed bearing. The other is arranged as a floating bearing.

The driven shaft is also firmly mounted or only mounted with a small amount of play. This means that the axial position of the driven shaft is substantially fixed.

Figure 2:
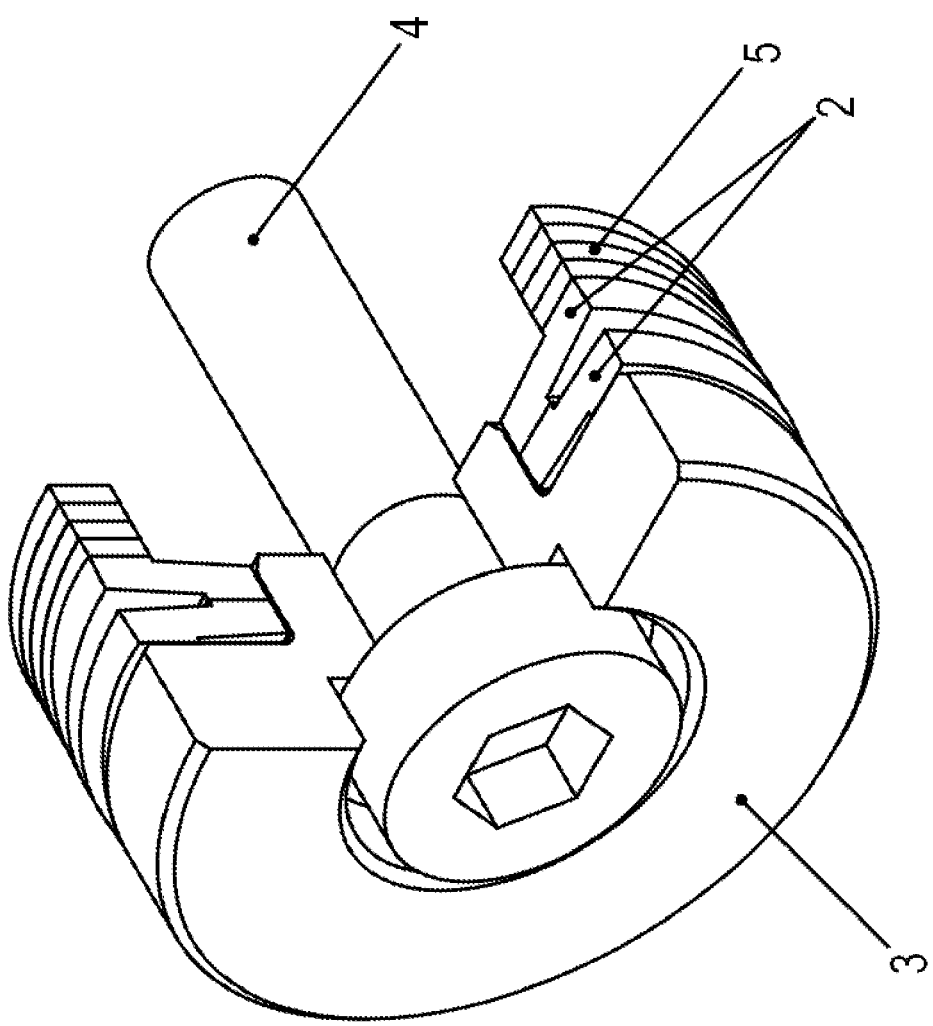
FIG. 2 is a perspective view of the spacing bracket.

As illustrated in FIG. 2, two plate springs arranged in a mirror-inverted manner to each other can be used as a spring device. Alternatively, however, only a single plate spring or a stack of plate springs can be used.

Since an inner collar projects axially from the plate part 3 towards the stub portion 6 of the first sun gear 7, the spring device 2 is held and guided in a centered position.

The outer diameter of the screw head is smaller than the clear inner diameter of the spring device 2. This means that the plate part 3 is also elastically deformed when the screw 4 is screwed into the threaded bore.

For example, a deep groove ball bearing is accommodated in the stub portion 8 of the second sun gear 9 and rotatably mounts the second stub portion 8 relative to the first sun gear 7, thus, also ensuring a minimum distance.

The respective sun gear can also be described as a sun wheel.

For example, the sun gears 7 and 9, which are arranged one behind the other in the axial direction, are arranged in a floating manner, thus, e.g., have a clearance in the axial direction.

The respectively next sun gear 9 has a grooved ball bearing on the end face towards the previous sun, so that only a small amount of frictional heat is generated on contact due to the different speeds. The last sun gear is also arranged rotatably with low friction via a deep groove ball bearing arranged on the end face of the driven shaft, i.e., the last planetary carrier.

Via the spring device 2, the entire strand formed by all the sun gears (7, 9) can thus be preloaded if the clearances for the sun gears were reduced accordingly. This is because the driving shaft and the driven shaft are positioned in a fixed axial manner in relation to the strand.

This reduction in clearance is either provided for during manufacture or occurs during operation, for example, due to shocks that temporarily shift the axial position of the driving shaft in the millimeter range, e.g., in the microsecond range.

An alternatively selected, permanent preload in the strand prevents a sun gear from hitting a deep groove ball bearing.

This means that a permanent preload can also be achieved under certain circumstances.

REFERENCE NUMERAL LIST

1 Driving shaft
2 Spring device
3 Plate part
4 Screw
5 Spacer, e.g., shim washer
6 Stub portion of the first sun gear 7
7 First sun gear
8 Stub portion of the second sun gear
9 Second sun gear
10 Second planetary gear
11 First planetary carrier
12 First planetary gear
13 Bearing
14 Toothing area

The invention claimed is:

1. A planetary-gear mechanism, comprising:
a driving shaft; and
a first sun gear connected to the driving shaft and adapted for conjoint rotation with the driving shaft, the first sun gear including a stub portion and a screw in threaded engagement with a threaded bore of the stub portion, a screw head of the screw pressing onto a plate part that presses onto the stub portion via (a) a spring device and at least one spacer and/or (b) a spring device.

2. The planetary-gear mechanism according to claim 1, wherein the plate part bears against the driving shaft and/or touches the driving shaft.

3. The planetary-gear mechanism according to claim 1, wherein the plate part, on a side facing away from the spring device, bears against the driving shaft and/or at least temporarily touches the driving shaft.

4. The planetary-gear mechanism according to claim 1, wherein the driving shaft includes a bore, and the stub portion projects into the bore.

5. The planetary-gear mechanism according to claim 1, wherein the driving shaft includes an axial bore, and the stub portion projects into and is accommodated in the axial bore.

6. The planetary-gear mechanism according to claim 1, wherein the plate part bears against a step of a stepped bore.

7. The planetary-gear mechanism according to claim 1, wherein the threaded bore is arranged in a center of the stub portion and/or is axially aligned with the stub portion.

8. The planetary-gear mechanism according to claim 1, wherein the stub portion includes an external toothing that cuts into a bore and/or into a wall of a bore of the driving shaft and/or meshes with an internal toothing arranged in a bore of the driving shaft.

9. The planetary-gear mechanism according to claim 1, wherein the plate part is rotationally symmetrical in relation to an axis of rotation of the first sun gear.

10. The planetary-gear mechanism according to claim 1, wherein the first sun gear includes a toothing that meshes with a toothing of a first planetary gear that mesh with an internal toothing of a first ring gear that is firmly connected to a housing part of the planetary-gear mechanism and/or is integral to a housing part of the planetary-gear mechanism.

11. The planetary-gear mechanism according to claim 10, wherein the first planetary gear is rotatably mounted on a pin of a first planetary carrier that is rotatably mounted and connected to a second sun gear and adapted for conjoint rotation.

12. The planetary-gear mechanism according to claim 11, wherein the second sun gear includes a stub area having an external toothing that cuts into a bore of the first planetary carrier and/or meshes with an internal toothing of the first planetary carrier, a first annular groove and a second annular groove, axially spaced from the first annular groove, are arranged in the stub area of the second sun gear, a first retaining ring being accommodated in the first annular groove, a second retaining ring being accommodated in the second annular groove, an external toothing being arranged in an axial direction between the first retaining ring and the second retaining ring.

13. The planetary-gear mechanism according to claim 12, wherein the second sun gear is fixed in the axial direction relative to the first planetary carrier.

14. The planetary-gear mechanism according to claim 1, wherein the plate part is pressed by the spring device onto the driving shaft and/or onto a step of a stepped bore of the driving shaft.

15. The planetary-gear mechanism according to claim 1, wherein the spring device is arranged between the plate part and the first sun gear and/or the stub portion.

16. The planetary-gear mechanism according to claim 1, wherein, in relation to an axis of rotation of the first sun gear, the radial distance area covered by the stub portion and/or by the first sun gear includes a radial distance area covered by the plate part.

17. The planetary-gear mechanism according to claim 16, wherein the stub portion extends radially further than the plate part.

18. The planetary-gear mechanism according to claim 1, wherein the plate part, the spring device, and the spacer are accommodated and/or countersunk in a bore of the stub portion, the bore and the threaded bore together being arranged as stepped bore in the stub portion.

19. The planetary-gear mechanism according to claim 1, wherein the driving shaft is rotatably mounted via two bearings accommodated in a housing of the planetary-gear mechanism.

20. The planetary-gear mechanism according to claim 1, wherein the plate part is arranged as a metal plate part.

21. The planetary-gear mechanism according to claim 1, wherein an outer diameter and/or a largest outer diameter of the stub portion is smaller than an outer diameter of a toothing of the first sun gear that meshes with a toothing of a planetary gear.

22. The planetary-gear mechanism according to claim 1, wherein a series of coaxially aligned sun gears arranged one behind the other in an axial direction is formed of the first sun gear and at least one further sun gear, the series of sun gears having axial play, the driving shaft and a driven shaft being arranged coaxially to the series of sun gears, a bearing of the driving shaft adjacent to the series of sun gears being arranged as a fixed bearing, a bearing of the driven shaft adjacent to the series of sun gears being arranged as a fixed bearing.

23. A planetary-gear mechanism, comprising:
a driving shaft; and
a first sun gear connected to the driving shaft and adapted for conjoint rotation with the driving shaft, the first sun gear including a stub portion and a screw in threaded engagement with a threaded bore of the stub portion, a screw head of the screw pressing onto a plate part that presses onto the stub portion via a spring device.

24. The planetary-gear mechanism according to claim 23, wherein the screw head of the screw presses onto the plate part that presses onto the stub portion via the spring device and at least one spacer.

* * * * *